Oct. 29, 1935.	O. E. SZEKELY	2,019,367
OVERRUNNING GEARLESS DIFFERENTIAL
Filed Oct. 18, 1932   2 Sheets-Sheet 1

Inventor:
Otto E. Szekely,
by Sturtevant, Mason & Porter
Att'ys.

Oct. 29, 1935.    O. E. SZEKELY    2,019,367
OVERRUNNING GEARLESS DIFFERENTIAL
Filed Oct. 18, 1932    2 Sheets-Sheet 2
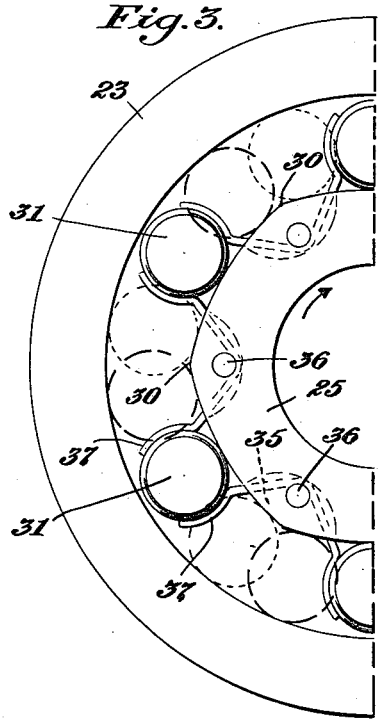
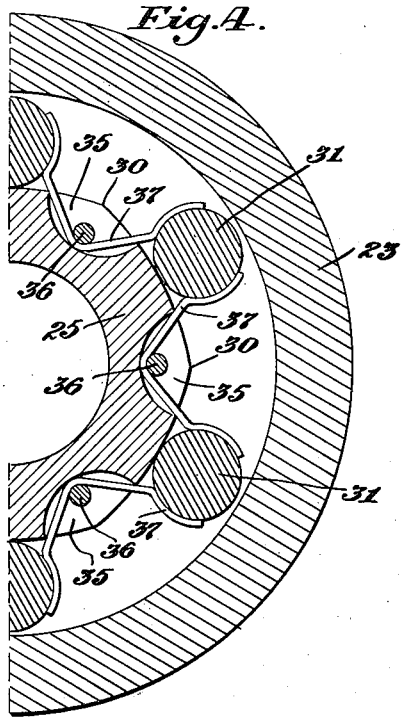
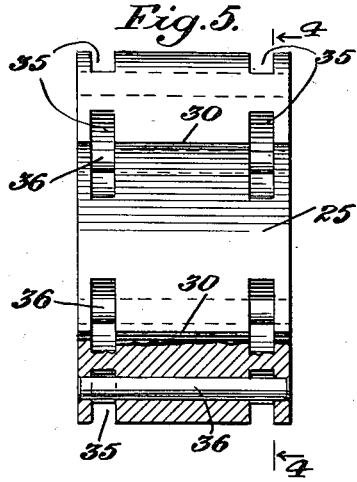
Inventor:
Otto E. Szekely,
by Sturtevant, Mason & Porter
Att'ys.

Patented Oct. 29, 1935

2,019,367

UNITED STATES PATENT OFFICE 2,019,367

OVERRUNNING GEARLESS DIFFERENTIAL

Otto E. Szekely, Baltimore, Md.

Application October 18, 1932, Serial No. 638,363

5 Claims. (Cl. 74—389.5)

This invention relates to a differential gearing of the type currently employed for transmitting power to driving wheels of a vehicle.

One of the features of the present invention is the provision of a differential which employs no gears for establishing a driving relationship between a driven structure and the two driven shafts.

Another feature of the present invention is the provision of a differential in which clutches are employed for establishing a driving relationship between a rotated structure and the two shafts, these clutches being operative in either direction of rotation of the structure, and being competent of passing into a neutral intermediate position whereby a disconnection of the structure and the corresponding shafts is accomplished.

Still another feature of the present invention is the provision of a differential assembly including a driving structure and a pair of independent clutches for connecting the driving structure to the driven shafts, and operating when the driving structure is moving at a greater angular rate than either or both said shafts to couple one or both of the shafts for driving: but becoming disengaged when one or both of the shafts is moving at a greater angular speed than the driving structure.

Other features of the invention reside in specific preferred forms of construction, as will appear from the course of the following specification and claims.

In the drawings:

Figure 3 is an enlarged fragmentary end elevation of one clutch structure.

Figure 4 is a sectional view on line 4—4 of Figure 5, of a fragment of the clutch structure.

Figure 5 is a side elevation, with a part broken away, of the clutch cam core.

Figure 1:
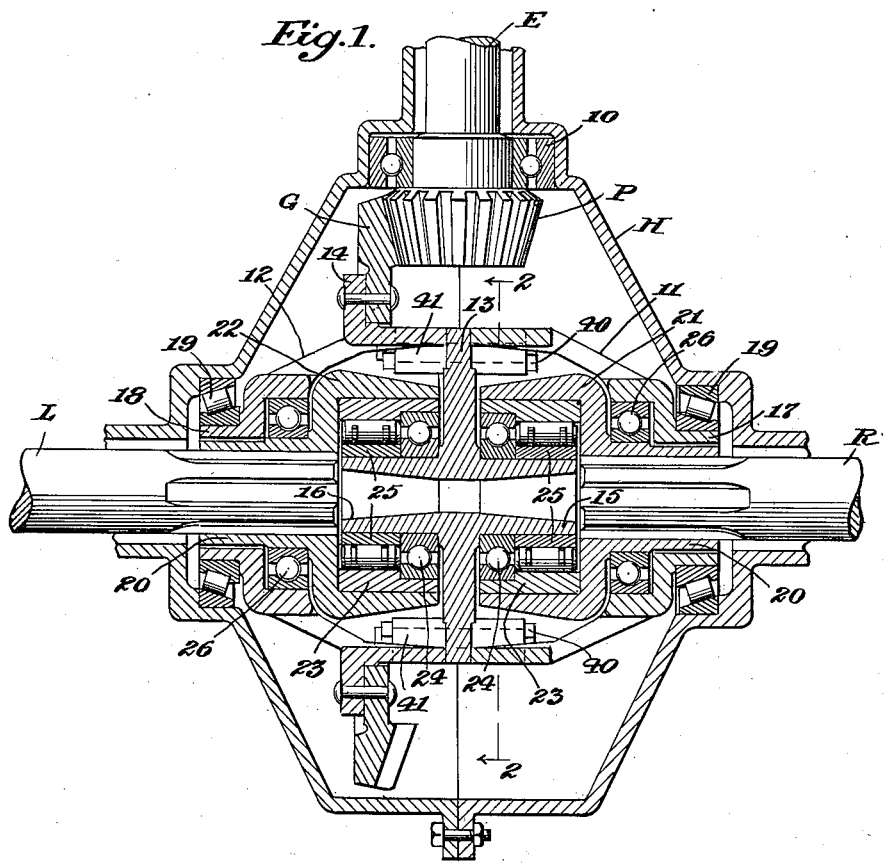
Figure 1 is a sectional view, taken on the axes of the driving and driven shafts.
Figure 2:
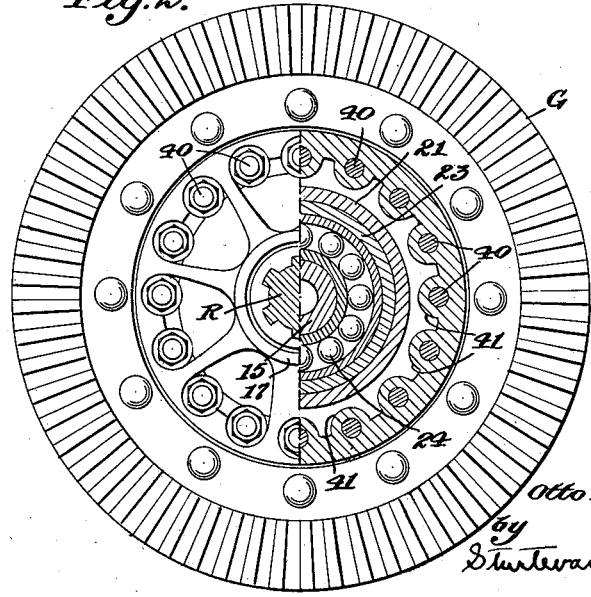
Figure 2 is a view parallel with the axis of the driving shaft with the housing removed and showing one-half of the structure in vertical section.

In the drawings, Figure 1 shows a conventional assembly of a shaft E driven from a prime mover, a pair of driven shafts R, L, and an enclosing housing H, here shown as comprised of two halves suitably connected together and serving as usual to contain a supply of lubricant for the moving elements. The driving shaft E is supported by an anti-friction bearing 10 in the housing H and has a pinion P fixed at its end to engage a ring gear G of the differential. This is illustrated as a conventional arrangement of these parts.

The differential according to the present invention comprises a pair of shells, 11, 12, which are rigidly connected to and separated by a web 13. Shell 12 has a peripheral flange 14 upon which the ring gear G is mounted. The central web 13 has pins 15, 16 coaxial with the driven shafts R, L. The shells 11, 12 have extensions 17, 18 upon which are mounted the anti-friction bearings 19 which support the rigid differential driving structure comprising the shells 11, 12 and the central web 13.

The ends of shafts R, L are splined and fit within correspondingly grooved hubs 20 of a pair of axle caps 21, 22 which have cylindrical recesses directed toward one another, but separated by the central web 13. Fixed within these recesses are provided clutch rings 23 which at their outer edges are recessed to receive the outer races of anti-friction bearings 24. The web pins 15, 16 support the inner races of the anti-friction bearings 24 adjacent the central web 13: and likewise support the clutch cam cores 25 which are fixed to the web pins. Anti-friction bearings 26 are provided between the shells 11, 12 and the corresponding hubs 20.

As shown in Figures 3, 4 and 5, the clutch cam cores 25 are each provided with a plurality of surfaces which are separated from one another, in this preferred form of construction, at ridge points 30 which extend parallel to the axis of the shafts R, L. Between the ridge points, the clutch cam core has surfaces which relatively approach the axis and then recede from it, being substantially symmetrical at either side of a plane passing through the axis and the closest line of this surface. Such surfaces have greater radii than the radial distance of a point of the surface to the common axis. For example, such a clutch cam core surface may be produced by grinding while supporting the core on a rotating mandrel, with the core supported eccentrically on the mandrel with its axis closer to the grinding stone than the distance from the stone to the axis of the mandrel. On each of the surfaces of the clutch cam core is provided a roller 31 which is of slightly lesser diameter than the distance from the inner surface of the clutch ring 23 to the portion of the said core surface which is closest to the core axis, but is of greater diameter than the distance from the inner surface of the clutch ring 23 to either adjacent ridge 30. The distance between the rollers and clutch ring is exaggerated in the drawings, for clearness.

As shown in Figures 3, 4 and 5, the clutch core 25 has its ridges 30 cut away to provide recesses 35: and pins 36 extend parallel to the core axis and across the bottoms of these recesses. Centering springs 37 are provided, which in the illustrated form are of substantially V-shape, with the bights located within the recesses and held therein by the pins 36. The outer ends of these V-springs are preferably curved to conform to the surfaces of the rollers 31. It will be noted that the rollers and V-springs form an assembly whereby the rollers are caused to move co-ordinately: and by the engagement of the bottoms of the V-springs 37 with walls of the recesses 35, the springs tend to effect a centering of the rollers and hold them barely out of contact with the surrounding clutch ring 23.

It will be noted that the structure comprises elements which may be simply and quickly fashioned by turning and grinding, since the wearing surfaces are circular in section: that the several parts are amply supported in respect to one another and to the housing H, and that the two shafts serve to stiffen one another and are held in proper coaxial position. The assemblage may be effected by the employment of bolts or the like 40, passed through lugs 41 of the shells 11, 12. The shells 11, 12 are preferably cut away as shown from point to point to provide for ample delivery of lubricant into and onto the surfaces of the parts contained therein.

In operation, if the device is employed on a vehicle, with the driven shafts R, L connected to the right-hand and left-hand wheels, for example, and this vehicle is at a standstill, the rollers 31 will normally be held out of engagement with the clutch core 25, by the action of the centering V-springs 37 (full lines, Fig. 3). If the driving shaft E is now set in rotation in either direction, the pinion P drives the ring gear G and therewith the shells 11, 12, and the centering web 13 are rotated, so that the web pins 15, 16 turn and with them the cam cores 25. The slight inertial resistance effects of the rollers 31, and the centrifugal force thereon, tend to bring them into contact with the clutch rings 23 and to cause them to be delayed thereby so that the corresponding cores 25 turn beneath them and cause wedging of the rollers 31 between the inner surface of the clutch ring 23 and the surfaces of the cores between the ridges 30 thereof, but closer to one ridge than before. Thus, for example, if the clutch cam core 25 in Figure 3 is being rotated in a clockwise direction as shown by the arrow, the rollers 31 will tend to move into the position shown by light dotted lines. Each clutch, therefore, operates to connect the system so that the driving shaft E turns both driven shafts R, L at the same angular speed.

If the shaft E were rotated in the opposite direction, the same phenomena will occur, but in this instance the rollers will move toward the other limiting ridge 30 of the particular clutch core surface, i. e. into the position shown by the heavy dotted lines in Figure 3.

This immediate coupling of the engine shaft to the shafts R, L is accomplished whenever the engine shaft E is rotated at a greater angular speed than the shafts R, L, and since this is independent for the two shafts, either will be connected as soon as its speed falls below the speed corresponding to the drive from the engine shaft E.

If at any time the speed of rotation of either wheel exceeds the speed which would be imparted to it at the particular angular speed of the shells 11, 12 as imparted by the engine shaft E, the corresponding clutch ring 23 tends to overrun the corresponding clutch cam core 25, causing a relative movement of the rollers 31 with respect to both the ring and core, until these rollers are liberated and moved to and detained at their central positions under the urgency of their centering springs. Thus, the particular wheel is disconnected from the engine shaft, through the operation of its clutch, and the friction of parts in the transmission, propeller shaft, and even in the ring gear and differential system is eliminated from action upon this wheel and its axle, and the wheel is free for the so-called "free-wheeling" operation.

If the vehicle is turned to the right, the wheel connected to the right-hand shaft R passes along an arc of a circle of lesser radius than the arc of the circle traversed by the wheel on shaft L. Therefore, the shaft L turns at a greater angular speed than the shaft R. The engine shaft E continues to drive the shaft R through the clutch system surrounding the web pin 15: while the overrunning effect of the outer or left-hand wheel causes the clutch system surrounding the web pin 16 to become disengaged. Therefore, the outer wheel is disengaged so that the two wheels may turn at different angular speeds, and the power is applied to the inner wheel. Therefore, skidding effects are automatically corrected, since the power applied to the inner wheel during skidding automatically tends to straighten the vehicle.

Further, if either wheel is unable to gain traction, for any cause, it may turn: but the tractional resistance to the other wheel produces an automatic clutching effect so that the wheel having traction is driven, and the vehicle can, for example, propel itself from a muddy spot.

It is obvious that the invention is not limited solely to the form of construction shown, but that is may be modified in many ways within the scope of the appended claims.

Having thus described the invention, what I claim as new and desire to secure by Letters Patent, is:—

1. A differential comprising a rigid rotatable structure including a rotatable member having a pair of axially extending projections with peripheral clutch cam surfaces and a rotatable housing, a pair of axle members having clutch rings located in said housing and having circular internal surfaces surrounding said cam surfaces, two sets of independent clutch devices located between said surfaces, resilient means fixedly mounted on each projection for coordinating the corresponding said clutch devices, and independent bearings between said projections and rings adjacent said rotatable member, and between said housing and axle members whereby bearings are provided at both axial ends of each said set of clutch devices.

2. A differential comprising a rotatable member having axial extensions provided with external clutch surfaces having a common axis and each having curved sections of greater radii than the distance to the common axis, axle members including clutch rings surrounding said extensions, rollers located between said surfaces and rings, and separate resilient means located between each two rollers and supported by the corresponding extension for coordinating the movement of the rollers on each extension.

3. A differential comprising a pair of shells and a central web and means for holding the same rigidly together as an assembly, bearings for supporting the assembly for rotation, axial extensions on said web, clutch cores on said extensions each having symmetrical curved external surfaces having a common axis and greater radii than the radial distance to the common axis, axle members rotatably mounted in said shells and including clutch rings surrounding said clutch cores, rollers located between said cores and rings, bearings between the free ends of said rings and the extensions and located adjacent the web for supporting the rings adjacent the corresponding rollers, and bearings between the axle members and the shells.

4. A differential comprising a rotatable member having axial extensions provided with clutch core surfaces having a common axis and constituting symmetrical circular sections of radii greater than the distance from a point on the surface to the common axis, axle members having each a clutch ring surrounding one said extension, rollers located between said surfaces and rings, and separate resilient means located between each two rollers and supported by the corresponding extension for coordinating the movement of the rollers on each extension.

5. A differential as in claim 4, in which said separate resilient means between each two rollers comprises V-springs for urging the rollers in opposite peripheral directions, and the extensions are each provided with recesses for receiving the bights of the springs, and pins passing through the bights for holding the springs on the extensions.

OTTO E. SZEKELY.